（12）United States Patent
Hornung et al.

(10) Patent No.: US 7,117,313 B2
(45) Date of Patent: Oct. 3, 2006

(54) USING LOCAL STORAGE TO HANDLE MULTIPLE OUTSTANDING REQUESTS IN A SCI SYSTEM

(75) Inventors: Bryan Hornung, Plano, TX (US); Bryan Marietta, Austin, TX (US); Robert K. King, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 10/803,289

(22) Filed: Mar. 18, 2004

(65) Prior Publication Data

US 2004/0177222 A1    Sep. 9, 2004

Related U.S. Application Data

(62) Division of application No. 08/797,674, filed on Jan. 31, 1997, now Pat. No. 6,718,375.

(51) Int. Cl.
*G06F 12/00* (2006.01)
(52) U.S. Cl. ..................... 711/147; 711/154
(58) Field of Classification Search ............ None
See application file for complete search history.

(56) References Cited

U.S. PATENT DOCUMENTS

| | | | |
|---|---|---|---|
| 5,434,976 A | 7/1995 | Tan et al. | |
| 5,826,028 A * | 10/1998 | Bennett et al. | 709/222 |
| 5,864,738 A * | 1/1999 | Kessler et al. | 709/239 |
| 5,875,352 A | 2/1999 | Gentry et al. | |
| 5,887,146 A * | 3/1999 | Baxter et al. | 710/104 |
| 6,718,375 B1 | 4/2004 | Hornung et al. | |

* cited by examiner

*Primary Examiner*—Reginald Bragdon
*Assistant Examiner*—Horace L. Flournoy

(57) ABSTRACT

A SCI controller manages responses and requests between SCI interconnection rings and memory access controllers. The SCI controller includes a request activation queue that stores information about the requests until the SCI rings have the resources to handle the requests. The controller also has a response activation queue that stores information about the responses until the memory access controller is accessible. The queues do not store the request and response packets, but rather store information that is used to construct the request and response packets. The SCI controller also has a contents addressable memory or CAM that checks for an address match between the current requests and responses and previous requests and responses. A table stores more specific information about the previous requests.

20 Claims, 3 Drawing Sheets

| FIELD | BITS | DESCRIPTION | |
|---|---|---|---|
| TABLE_STATE[0:2] | 0:2 | TABLE ENTRY STATE | |
| | | 0x0 | UNUSED |
| | | 0x1 | QUEUED |
| | | 0x2 | WAITING |
| | | 0x3 | QUEUED WAITING |
| | | 0x4 | ACTIVE |
| | | 0x5 | DONE |
| FLOW_TYPE[0:2] | 3:5 | ERI TRANSACTION TYPE | |
| | | 0x0 | READ SHARED |
| | | 0x1 | READ PRIVATE |
| | | 0x2 | ROLLOUT/DFLUSH |
| | | 0x3 | READ CURRENT |
| | | 0x4 | WRITE PURGE |
| | | 0x5 | GLOBAL FLUSH |
| | | 0x6 | INCREMENT UPDATE |
| | | 0x7 | NON-COHERENT |
| MASTER_ID[0:5] | 6:11 | TRANSACTION MASTER(FROM CROSSBAR) | |
| TRANSACTION_ID[0:5] | 12:17 | TRANSACTION ID(FROM CROSSBAR) | |
| CSTATE[0:5] | 18:23 | TRANSIENT ERI CACHE STATE | |
| CFORW[0:6] | 24:30 | ERI CACHE FORWARD POINTER | |
| CBACK[0:6] | 31:37 | ERI CACHE BACKWARD POINTER | |
| SHARED_PHASE | 38 | PHASE OF THE SHARING LIST (FOR INCREMENT UPDATE) | |
| T[0:1] | 39:40 | ADDRESS TYPE | |
| | | 0 | COHERENT SPACE |
| | | 3 | NON-COHERENT SPACE |
| NEXT[0:4] | 41:45 | NEXT CHAINED ENTRY | |
| WEAK | 46 | WEAK ORDERED FLOW | |
| MAGIC | 47 | MARKS A ROLLOUT AS DFLUSH RETURN OWNERSHIP ONLY(READ PRIVATE OR INCREMENT UPDATE) | |
| ROLLOUT_PHASE | 48:49 | USED TO RESOLVE ROLLOUT-INCREMENT_UPDATE COLLISIONS | |

FIG. 3 ional application of U.S. Pat. No. 6,718,375, having U.S. patent application Ser. No. 08/797,674, filed Jan. 31, 1997, entitled "USING LOCAL STORAGE TO HANDLE MULTIPLE OUTSTANDING REQUESTS IN A SCI SYSTEM," which is incorporated herein by reference.

TECHNICAL FIELD

This invention relates in general to memory accesses in multi-node, multi-processor, cache coherent non-uniform memory access system and relates in particular to managing multiple requests in such a system.

BACKGROUND

A Scalable Coherent Interface (SCI) Based System coherency flow requires multiple memory accesses. Each access takes many cycles, and therefore, the entire flow takes a great deal of time. The bandwidth of the SCI based system, designed with only one outstanding request, is determined by the latency of each flow. Even though in this type of system, the wires themselves are rated at gigabytes per second, the actual useful bandwidth for each node is limited to closer to 30 to 40 megabytes per second. The reason for this, is that the existing system has enough resources in the SCI controller to handle only one request or response at a time.

Therefore, there is a need in the art for a method and system that will use more of the available bandwidth of the system by allowing the system to have more than one outstanding request.

SUMMARY

This need and others are achieved in a system in which one embodiment has local storage for the cache line and tag, and a Contents Addressable Memory (CAM) for the cache line address, is used in the SCI controller to allow numerous outstanding requests or flows to be active at one time. All responses from the SCI ring that generate new SCI requests are handled in the controller without requiring additional memory accesses from the local memory. All conflicts with other SCI cache requests and outstanding flows are also handled by the controller.

One technical advantage of the present invention is to use a request activation queue to store a request until there are resources available on the SCI ring to handle the request.

Another technical advantage of the present invention is to use a response activation queue to hold a pointer to a CAM memory location and a table location, so that when the MAC has the required resources to handle the response, the response packet will be formed from the information in the response activation queue.

A further technical advantage of the present invention is to use a SCI table to store information identifying which memory locations already have outstanding access requests.

A further technical advantage of the present invention is to use a content addressable memory with match ports to check if a local or ring request is to access a memory location that already has an outstanding request or response.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 shows the SCI table field definitions.

DETAILED DESCRIPTION

Figure 1:
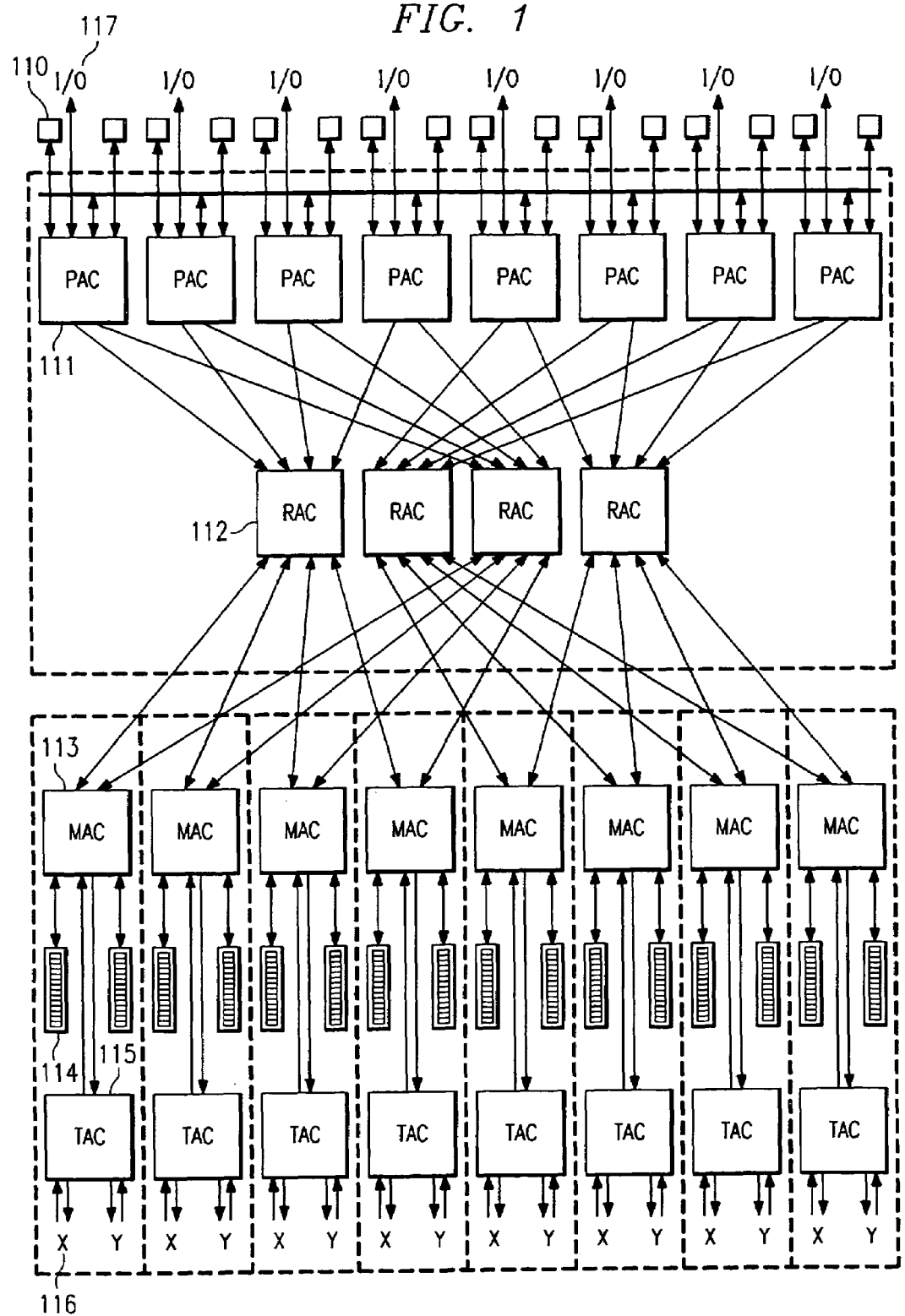
FIG. 1 shows a single node of a multi-node, multi-processor system that uses the inventive TAC arrangement.

FIG. 1 depicts a single node of a multi-node, multi-processor computer system. The overall system may have a plurality of the nodes shown in FIG. 1.

Each node, in the embodiment shown, can support up to sixteen processors 110. These processors 110 are connected to processor agent chips (PACs) 111. The function of each PAC 111 is to transmit requests from its associated processors 110 through cross bar router chips (RAC) 112 to the memory access chips (MAC) 113 and then forward the responses back to the requesting processor. Each PAC 111 has an input/output (I/O) subsystem 117. Each MAC 113 controls access to its associated coherent memory 114. Each MAC 113 is connected to four banks of memory 114 (only two are shown for simplicity). Each bank of memory has four dual in-line memory module boards (DIMM).

When a processor 110 generates a request to access memory (or other resource), the associated PAC 111 sends the request through the proper RAC 112 to a MAC 113. If the request is destined for memory 114 on the local node, MAC 113 accesses the memory attached to it. If the request is destined for memory on another node, MAC 113 forwards the request to TAC 115. TAC 115 is the interface between the node and an SCI ring 116. TAC 115 is also known as a toroidal access chip or a SCI controller. The SCI rings 116 interconnect the nodes in the multi-node system.

Figure 2:
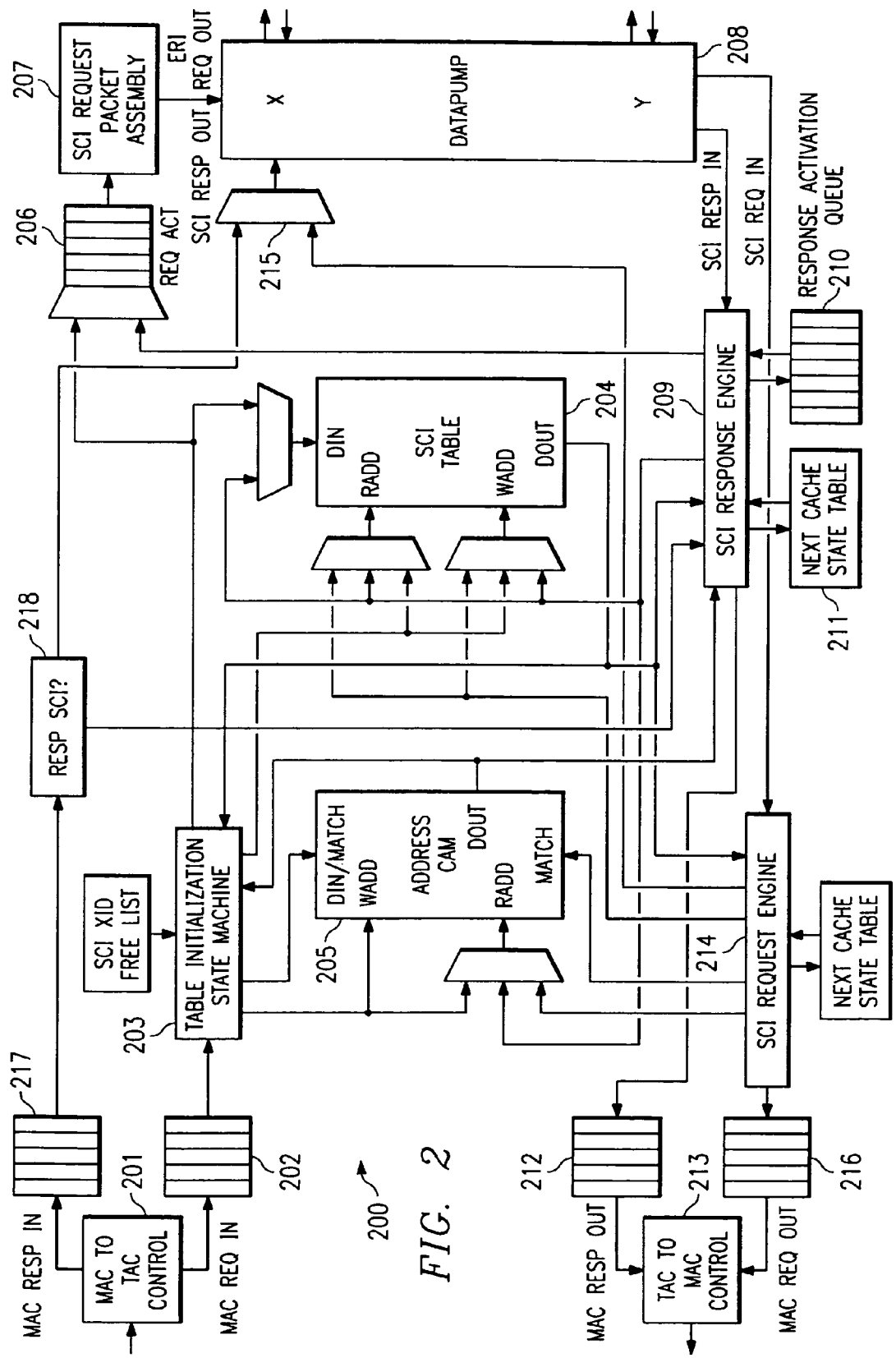
FIG. 2 shows high level block diagram of the inventive TAC arrangement.

FIG. 2 shows a high level block diagram of the inventive TAC 200. The following describes how data packets flow through this device. In general, the request will come in from a MAC 113 through an interface, MAC-to-TAC Control 201. A request will be split off by MAC-to-TAC control 201 and put into MAC Request In Queue 202. The Table Initialization State Machine 203 receives the requests from queue 202.

Table initialization state machine 203 will determine the first state in a flow, and then write that information into SCI Table 204. State machine 203 will also write any data that came in with the request into SCI table 204 and then write the address into Address CAM 205. Table initialization machine 203 will then send a request to Request Activation Queue 206. The request will remain in request activation queue 206 until there are sources available on ring 116 to handle the delivery of this request. SCI Request Packet Assembly 207 will translate the request into the symbols necessary to generate an SCI request. That request will be sent out on Datapump 208 to rings 116.

On a remote node, that request will be sent to a memory or cache 114, and that will generate a response. The response will come in on datapump 208. The response will travel on the SCI Response In wires and be delivered to SCI Response Engine 209. Response engine 209 will then read the contents of the table and the CAM that were written previously and will determine what to do next. The system is able to send another request to ring 116. The system may also send a response to MAC 113. Both the response sent to MAC 113, and the request sent to ring 116 can be busy, so the system has the capability to wait for resources while receiving response from ring 116.

Therefore, a request to ring 116 will use request activation queue 206, and the response to MAC 113 will use Response Activation Queue 210. As SCI response engine 209 will take the response, read the contents of address CAM 205 for the address, and SCI table 204 for the state, and then use Next Cache State Table 211 to determine what is to be done next.

If a response is generated and the flow is done, and there are enough response resources to actually generate the response to MAC 113, then engine 209 sends the response packet through MAC Response Out Queue 212 and then through TAC-to-MAC Control 213, which arbitrates with finality between MAC response out queue 212 and MAC Request Out 216 queue, and sends the proper packet to MAC 113.

As mentioned above, a request will then go out to ring 116. On another, remote node, that request will come to the node from ring 116 through that node's datapump 208. The request will enter the datapump 208, and then be sent to the remote node's SCI Request Engine 214. It will then check the address of that request with all addresses that are currently being worked on in that TAC 115. This check is done by the Contents Addressable Memory or Address CAM 205.

If there is a hit, the entry number generated by CAM 205 is then used to access SCI table 204 and the request is handled locally, and the response is sent out back to the ring for muxing between local responses from SCI request engine 214 and the MAC responses by SCI Response Out mux 215. If there was no hit in CAM 205, the request is sent to local MAC 113 to be handled by the memory controller, thus, the request goes into MAC Request Out Queue 216 through TAC-to-MAC Control 213.

The memory controller then handles that request and sends response back to TAC 115. The response comes in on MAC-to-TAC control 213. That response will then be routed to MAC Response In Queue 217, which will then be checked by Response SCI question block 218, which determines whether the response was generated for one of the local node requests, or if the response was generated from a ring request from a remote node. Since this is response from a ring request, then it is reformatted into ring packets and sent to mux 215 where it will then be forwarded to datapump 218.

The significant features of this system 200 that allow it to handle many outstanding requests and responses at the same time are Address CAM 205, SCI Table 204, Request Activation Queue 206, and Response Activation Queue 210. In this particular design, both CAM 205 and table 204 can handle 32 different requests at the same time. CAM 205 has within it 32 addresses, and the table 204 contains 32 states and 32 sets of data for any of the lines. Request Activation Queue 206 contains essentially just the pointer to SCI Table 204 and to an address location in CAM 205.

The SCI Request Packet Assembly 207 uses that pointer from Request Activation Queue 206 to read table 204 and the CAM 205 to assemble a request packet. These request packets can be up to 12 symbols long and are stored in the datapump until they are actually put on the ring.

For a response, MAC Response Out Queue 212 also holds fully assembled packets. Response Activation Queue 210 also holds a pointer to a CAM 205 location and to a table 204 location. When MAC Response Out Queue 212 has room, SCI Response Engine 209 will take the top response from of Response Activation Queue 210, use that index to read SCI table 204 and the address CAM 205 and will then assemble the response packet at that time.

As previously stated, CAM 205 is a contents addressable memory. This means is that there are match ports, wherein the data at the match ports can be applied to simultaneously check every location in CAM 205 to see if data exists that is identical to the data at the match port. If the data is identical, then CAM 205 generates an index which can be used by the various other state machines to access SCI table 204.

For example, State Machine 203, the table initialization state machine, checks all requests coming in from MAC 113 to see if there is already a request for that address in TAC 115. TAC 115 can only handle only one request for a given address at a time, so table initialization machine 203 will take the address generated by MAC 113 and apply it to CAM 205 with the data and match port, and CAM 205 will return with a hit or miss.

If there is a hit, CAM 205 will return with an index that table initialization machine 203 can use to access SCI table 204. SCI Response Engine 209 uses the index supplied by the response packet to address CAM 205. SCI Request Engine 214, takes an address that it gets from ring 116 and applies it to CAM 205 and using its match port CAM 205 will return with either a hit or miss. If it is a hit, it will return the index, which SCI Request Engine 214 can then use to access to SCI table 204. Other things that can access CAM 204 are Request Packet Assembly 207 which uses an index stored in Request Activation Queue 206 to read an address.

SCI Response Engine 209 only uses the read feature of CAM 204. This engine 209 received a transaction ID from the response off ring 116. This transaction ID is the exact same ID that was used to access CAM 205 and table 204 while generating the request by request activation queue 206.

When table initialization state machine 203 checks CAM 204 for a match on the address it received in a new request from MAC 113, machine 203 will do one of two things, depending on whether there is a hit or a miss. A hit means there is already an outstanding request in TAC 115 for a given address. In this case, the new request is chained onto the back of the other request so that it can be handled sequentially. If there is a miss, which should be the normal case, a new request is immediately generated and sent out to ring 116.

SCI Request Engine 214, also checks for a hit or miss on CAM 205. In the case when there is a hit, SCI Request Engine 214 handles the request locally with information contained in CAM 205 and table 204, and if there is a miss, the request is forwarded on to MAC 113 for handling by the memory controller.

SCI Table 204 is a 32 bit entry table that contains information described in FIG. 3. The table 300, includes a table_state. This state can be unused, which means that the table of this particular entry has not been used. The state can also be queued, which means that this entry is queued behind an active entry. Waiting means that this entry is waiting for more information from a MAC 113 before it can generate a request. Queued Waiting means the entry is queued behind another active request, and when that request is done, it will then have to wait for still more information from a MAC 113 before continuing. Active means that it is in the middle of an active flow, and Done means that the flow is done, but its resources have not been de-allocated.

Flow_Type 302 contains the transaction type. These are the different transactions that TAC 113 may perform. TAC 113 can perform read shared, read private, read rollout, read current, write purge, global flush, increment update, or various non-coherent transactions.

Master_ID 303 is the transaction master that was received from MAC 113 and indicates that this was the owner of the original request.

Transaction_ID 304 is also received from MAC 113, and indicates that this is the particular transaction from a given master. The transaction ID and the Master ID combined together are unique identifiers which allows responses to be returned to the requester.

The c_state 305 or cache state field is a transient cache state.

The c_forw 306 or cache forward is an SCI cache forward pointer.

The c_back 307 or cache backward field is the SCI backward pointer.

The shared_phase 308 is the shared phase used in the increment update flow.

The T field 309 encodes the type of access being performed with non-coherent accesses. Non-coherent accesses can go to memory space or they can go to CSR space.

The next field 310 is the next chained entry. This is used for chaining entries together when there are multiple requests to the same address outstanding in TAC 113.

The weak bit 311 is used in read private flow to determine whether there are weak or strong ordered responses.

The magic bit 312 is called magic because it has a number of different functions, depending on the type of flow being done. One major function is that it marks a rollout as a flush. A flush and rollout are identical except a flush sends a response at the end. Another major function is that it specifies that data has been returned for weak ordered flows.

The rollout phase bits 313 are used to specify additional transient cache states to resolve rollout and increment update collisions.

Although the present invention and its advantages have been described in detail, it should be understood that various changes, substitutions and alterations can be made herein without departing from the spirit and scope of the invention as defined by the appended claims.

What is claimed is:

1. A controller for managing a plurality of response packets and a plurality of request packets between interconnection rings and at least one memory access controller, the controller includes a table with a plurality of entries, each entry maintains a register of information about a particular packet from the plurality of response packets and the plurality of request packets, the table comprises:
    means for storing a table entry state which defines a current status of a entry of the plurality of entries;
    means for storing a flow type which defines a transaction being performed by the controller with the particular packet;
    means for storing a master identification which designates an originator of the packet; and
    means for storing a transaction identification which designates the packet for the originator;
    wherein the information stored in the table is used by the controller to direct its operations.

2. The controller of claim 1 wherein:
    the master identification and the transaction identification together form a unique identifier for each packet.

3. The controller of claim 1 wherein:
    the table entry state is selected from the group consisting of unused, queued, waiting, queue waiting, active, and done.

4. The controller of claim 1 wherein:
    the flow type is selected from the group consisting of read shared, read private, rollout, dflush, read current, write purge, global flush, increment update, and non-coherent.

5. The controller of claim 1 further comprising:
    means for queuing request information until interconnection rings are accessible; and
    means for queuing response information until the at least one memory access controller is accessible.

6. The controller of claim 4 further comprising:
    means for storing rollout phase data for resolving collisions between a flow having the rollout flow type and another flow having the increment update flow type.

7. The controller of claim 5 further comprising:
    means for constructing request packets from the request information.

8. The controller of claim 5 further comprising:
    means for constructing response packets from the response information.

9. The controller of claim 5 wherein said controller implements a Scalable Coherent Interface (SCI) protocol.

10. A method of managing, by a controller, a plurality of entries that are each associated with a respective packet of a plurality of response packets and a plurality of requests packets communicated between an interconnection ring of a multi-node processor system and at least one memory access controller, the method comprising:
    storing entry states that define current status information for each respective packet;
    storing flow types that define a transaction being performed by the controller for each respective packet;
    storing master identification information that designates an originator of each respective packet; and
    storing transaction identification information that identifies each respective packet for its originator;
    wherein said controller uses said entry states, flow types, master identification information, and transaction identification information to communicate packets between said at least one memory controller and said interconnection ring.

11. The method of claim 10 wherein a combination of a master identification and a transaction identification forms a unique identifier for a respective packet.

12. The method of claim 10 wherein said entry states are selected from the group consisting of: unused, queued, waiting, queue waiting, active, and done.

13. The method of claim 10 wherein the flow types are selected from the group consisting of: read shared, read private, rollout, dflush, read current, write purge, global flush, increment update, and non-coherent.

14. The method of claim 10 further comprising:
managing a request activation queue that stores request information until said interconnection ring is accessible; and
managing a response activation queue that stores response information until the at least one memory access controller is accessible.

15. The method of claim 13 further comprising:
storing rollout phase data for resolving collisions between a flow having a rollout flow type and another flow having an increment update flow type.

16. The method of claim 14 further comprising:
assembling request packets from said request information.

17. The controller of claim 14, further comprising:
assembling response packets from the response information.

18. A controller for managing a plurality of response packets and a plurality of request packets between interconnection ring of a multi-node processor system and at least one memory access controller, the controller comprising:
a table structure for storing, for each respective packet, an entry state that defines current status information, a flow type that define a transaction being performed by the controller, master identification information that identifies an originator, transaction identification information defined by a respective originator,
a request activation queue for storing information until said interconnection ring is accessible; and
a response activation queue for storing response information until the at least one memory access controller is accessible.

19. The controller of claim 18 further comprising:
a request packet assembler for constructing request packets from the request information.

20. The controller of claim 18 further comprising:
a response engine for constructing response data packets from the response information.

* * * * *